(12) United States Patent
Koide

(10) Patent No.: US 7,835,037 B2
(45) Date of Patent: Nov. 16, 2010

(54) IMAGE PROCESSING APPARATUS AND IMAGE PROCESSING METHOD

(75) Inventor: Yasuhisa Koide, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 975 days.

(21) Appl. No.: 11/653,248

(22) Filed: Jan. 16, 2007

(65) Prior Publication Data

US 2007/0188823 A1 Aug. 16, 2007

(30) Foreign Application Priority Data

Jan. 17, 2006 (JP) ............................. 2006-008495

(51) Int. Cl.
*H04N 1/00* (2006.01)
*H04N 1/40* (2006.01)
*H04N 1/04* (2006.01)
*G06K 9/00* (2006.01)

(52) U.S. Cl. .................. 358/474; 358/426.04; 358/434; 382/181

(58) Field of Classification Search ................ 358/530, 358/474, 443, 448, 1.9, 426.04, 426.06, 434, 358/452; 382/254, 103, 125, 174, 175, 176, 382/177, 199, 181
See application file for complete search history.

(56) References Cited

U.S. PATENT DOCUMENTS

| | | | |
|---|---|---|---|
| 5,848,202 A | 12/1998 | D'Eri | |
| 5,999,664 A | 12/1999 | Mahoney | |
| 6,546,385 B1 | 4/2003 | Mao | |
| 7,375,364 B2 * | 5/2008 | Mochizuki et al. | 250/589 |
| 2002/0065853 A1 * | 5/2002 | Takahashi et al. | 707/527 |
| 2002/0170966 A1 | 11/2002 | Hannigan | |
| 2003/0061200 A1 | 3/2003 | Hubert | |
| 2004/0213458 A1 | 10/2004 | Kanatsu | |
| 2005/0114351 A1 | 5/2005 | Yano | |
| 2005/0273491 A1 * | 12/2005 | Meyer et al. | 709/203 |
| 2007/0177204 A1 * | 8/2007 | Kamasuka et al. | 358/1.15 |
| 2009/0064102 A1 * | 3/2009 | Barcia et al. | 717/113 |
| 2009/0125402 A1 * | 5/2009 | Voltmer et al. | 705/14 |
| 2009/0144151 A1 * | 6/2009 | Pajot | 705/14 |

(Continued)

FOREIGN PATENT DOCUMENTS

JP 07-021214 1/1995

(Continued)

OTHER PUBLICATIONS

European Patent Office Search Report dated Apr. 12, 2007, for corresponding Eurpean Patent Application No. 07100676.1-1224, May 2007.

(Continued)

*Primary Examiner*—Jerome Grant, II
(74) *Attorney, Agent, or Firm*—Harness, Dickey & Pierce, P.L.C.

(57) ABSTRACT

In an image processing apparatus for creating an electronic file from a paper document with the use of an optical reading device, a detecting part detecting a code included in image data read by means of the optical reading device; a data creating part decoding the code to obtain identification information, obtaining related information identified by the identification information, and obtaining character information from the related information, and creating character data from the character information; and a file creating part creating a document file storing the character data.

16 Claims, 16 Drawing Sheets

| ORDER | WORD | OCCURRING NUMBER (TIMES) |
|---|---|---|
| 1 | skyscraper | 4 |
| 2 | tone | 3 |
| 3 | taxi | 3 |
| 4 | yellow | 2 |
| : | | |
| 10 | matenro | 1 |

U.S. PATENT DOCUMENTS

2009/0308927 A1* 12/2009 Longacre et al. ......... 235/462.1

FOREIGN PATENT DOCUMENTS

| JP | 09-198404 | 7/1997 |
| JP | 11-203381 | 7/1999 |
| JP | 2003-067363 | 11/2002 |
| JP | 2004-326541 | 12/2004 |
| JP | 2005-149096 | 6/2005 |
| JP | 2005-149210 | 6/2005 |
| WO | WO 03075211 | 9/2003 |

OTHER PUBLICATIONS

"Display of Layers," Adobe Reader® 7.0 Help Menu, with English translation (2 pages), Apr. 2007.

"Introduction," Chapter 1, by Adobe Systems Incorporated, PDF Reference, Fifth Edition, Version 1.6, pp. 1-5, with English translation. (URL=http://partners.adobe.com/public/developer/en/acrobat/sdk/pdf/pdf_creation_apis_and_specs/PDFReference.pdf.), Apr. 2007.

"HG/PscanServPlus," HyperGear Inc., pp. 1-6, with English translation (11 pages). (URL=http://www.hypergear.com/pdf/pscanserv_plus_product.htm#05.), Apr. 2007.

"Practical Image Processing Learned with C-language—for Windows, Macintosh and X-Window," by Masaki Inoue, Masaki Hayashi, Koji Mitani, Nobuyuki Yagi, Eisuke Nakasu and Masto Okui, pp. 40-41, Ohm Publishing Co., Ltd., with English translation (3 pages), Apr. 2007.

* cited by examiner

FIG.5
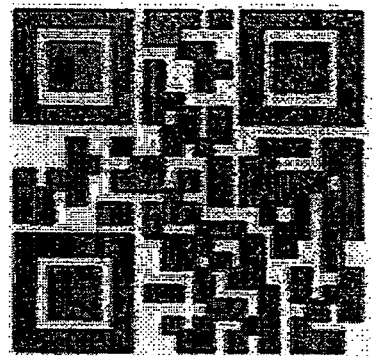
(a)
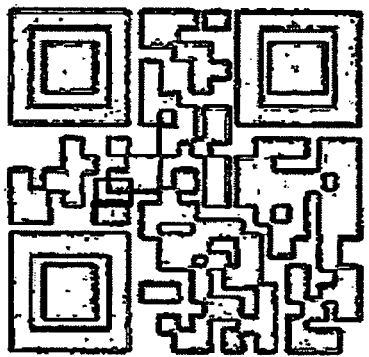
(b)
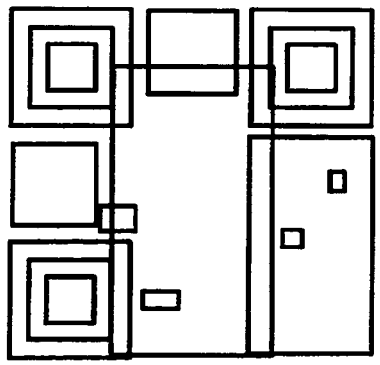
(c)
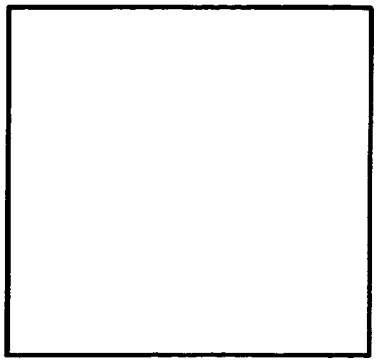
(d)

FIG.7

| ORDER | WORD | OCCURRING NUMBER (TIMES) |
|---|---|---|
| 1 | skyscraper | 4 |
| 2 | tone | 3 |
| 3 | taxi | 3 |
| 4 | yellow | 2 |
| ⋮ | | |
| 10 | matenro | 1 |

TWO-DIMENSIONAL CODE 1001

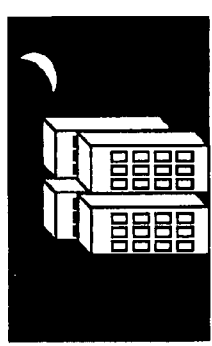

Report R
2005/09/05

A trend of art deco started in Paris caught attentions of Americans who like something new. In late 1920s in U.S, it is no exaggeration to say that everything was decorated with the art deco style from matenro to a package of detergent.

(b)

CHARACTER DATA OF
TWO-DIMENSIONAL
CODE 1002

Report R    K1,K2 — www.richo.co.jp/xxx.pdf
            K4 — skyscraper
2005/09/05  K3 — tone
               — taxi A trend of art deco started in Paris caught attentions of Americans who like something new. In late 1920s in U.S, it is no exaggeration to say that everything was decorated with the art deco style from matenro to a package of detergent.

(c)

NEW
TWO-DIMENSIONAL
CODE 1003

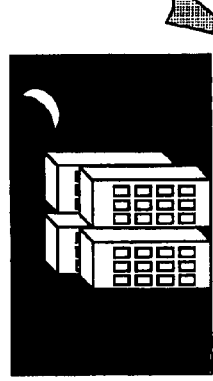

Report R
2005/09/05

A trend of art deco started in Paris caught attentions of Americans who like something new. In late 1920s in U.S, it is no exaggeration to say that everything was decorated with the art deco style from matenro to a package of detergent.

FIG.16A

—Maestros of modern architecture—
New York is a representative of a
city with skyscraper characterized
by its simple and straight design
compared with French cities
characterized by curves. Many
architects made their base at a
corner of the skyscraper where
modern buildings were lined up, they
observed quickly changing trends of
youngsters, and reflected their
observation to the modern
architecture. Vivid yellow color
represented by yellow cabs is also
an important factor adding glamour
to New York landscapes. Buildings
that are situated in the center
where taxi line up are designed with
color tone in mind so that the
yellow color can be blended in.

FIG.16B

—Maestros of modern architecture—
New York is a representative of a
city with skyscraper characterized
by its simple and straight design
compared with French cities
characterized by curves. Many
architects made their base at a
corner of the skyscraper where
modern buildings were lined up, they
observed quickly changing trends of
youngsters, and reflected their
observation to the modern
architecture. Vivid yellow color
represented by yellow cabs is also
an important factor adding glamour
to New York landscapes. Buildings
that are situated in the center
where taxi line up are designed with
color tone in mind so that the
yellow color can be blended in.

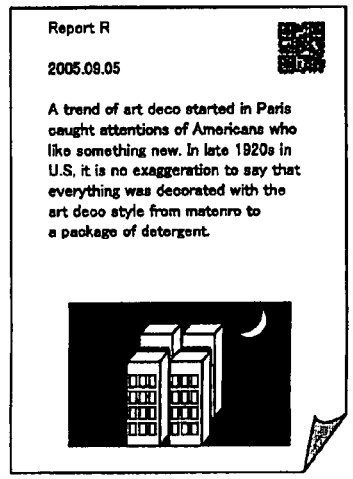

Report R 2005.09.05

A trend of art deco started in Paris
caught attentions of Americans who
like something new. In late 1920s in
U.S, it is no exaggeration to say that
everything was decorated with the
art deco style from matenro to
a package of detergent.

IMAGE PROCESSING APPARATUS AND IMAGE PROCESSING METHOD

BACKGROUND OF THE INVENTION

1. Field of the Invention

The present invention relates to an image processing apparatus and an image processing method, in which an electronic file is created from optically reading (scanning) a paper document.

2. Description of the Related Art

Recently, by connecting to the Internet, it is possible to access a large amount of information. Further, such an environment that any person can connect to the Internet is being provided.

Further, in order to make it possible to obtain detailed information, which may not be possible to include in a visually printed image or characters of a magazine, a newspaper column, an advertisement, or such, a two-dimensional code is attached to such visually printed information for including a URL (Uniform Resource Locator), a linkage destination, or such.

In this connection, creation of image data from encoding binary data, character data or such, has come into wide use. For example, a QR code (registered trademark) is known as a means for providing a code with high reliability provided with an error correction code, which is standardized by JIS (Japan Industrial Standard). In this regard, see JIS X0510 "two-dimensional code symbol (QR code basic specification)". By applying a two-dimensional code such as a QR code, it is possible to encode a much amount of data, in comparison to a traditional barcode.

Japanese Patent No. 3518304 discloses an information reading system by which, as described above, a document in which a URL is inserted in a form of a two-dimensional code is printed as a paper document, the URL information decoded from the two-dimensional code when the paper document is read by means of a camera is displayed.

Japanese Laid-Open Patent Application 2005-149096 discloses an image processing system searching a predetermined document from a database with the use of attached information such as a two-dimensional code or such (pointer information providing a storage location) included in a paper document.

Further, character information managed in such a form of printed on a paper document may be converted into image data as electronic data by means of an optical reading device or such, and further, may be converted into text data by means of OCR (Optical Character Recognition) technology. Thus, an electronic file may be created from the character information.

SUMMARY OF THE INVENTION

According to the art disclosed by Japanese Laid-Open Patent Application No. 2005-149096 mentioned above, a document in a database can be easily retrieved with the use of a code such as a two-dimensional code. However, when an electronic document having the code is taken out from the database, the predetermined document cannot be accessed even from decoding the above-mentioned attached information.

According to the art disclosed by Japanese Patent No. 3518304, information included in encoded information has merely linkage information such as a URL merely providing location information for related information. When a full-text search is carried out for searching for a document with a keyword, only words included in the document is subject to search. That is, words included in a first document (related information) located at a linkage destination, location information indicating this linkage destination being included in a second document, is not subject to the search. Accordingly, the second document, even thought it cites the first document in a form of the location information there, is not hit, while the first document is hit, when a keyword which is included in the first document but is not included in the second document is used as a keyword in the search.

According to the present invention, in order to solve the problems, for creating an electronic file (document file) from a paper document which originally has a code which includes file location information for reaching related information, second character data is obtained from the related information related to the code. Then, the document file includes the thus-obtained second character data together with first character data originally included in the paper document.

Then, when the document file is subject to full-text search, high speed keyword search is allowed for, not only the first character data originally included in the paper document, but also for the second character data thus obtained from the related information.

According to the present invention, an image processing arrangement for creating an electronic file from a paper document with the use of an optical reading device, has a detecting part detecting a code included in image data read by means of the optical reading device; a data creating part decoding the code to obtain identification information, obtaining related information identified by the identification information, and obtaining character information from the related information, and creating character data from the character information; and a file creating part creating a document file storing the character data.

Thereby, it is possible that character data, obtained from related information, which is available from a two-dimensional code included in image data obtained from reading a paper document, and then included in an electronic file, may be used for full-text search, and thus, it is possible to achieve highly useful search.

BRIEF DESCRIPTION OF THE DRAWINGS

Other objects and further features of the present invention will become more apparent from the following detailed description when read in conjunction with the accompanying drawings:

FIG. 5 illustrates two-dimensional code search processing for an example of a QR code;

FIG. 7 shows an example of words selected as keywords in the embodiment 1;

FIG. 10 (*a*) diagrammatically shows image data read from a paper document, (*b*) diagrammatically shows character data in an electronic file and (*c*) diagrammatically shows image data in the electronic file;

FIG. 16A shows the document of FIG. 15A in a form of an ordinary document;

FIG. 16B shows a state in which keywords are selected from the document shown in FIG. 16A; and FIG. 16C shows a second document created citing the document of FIG. 16A.

DETAILED DESCRIPTION OF THE PREFERRED EMBODIMENTS

Figure 1:
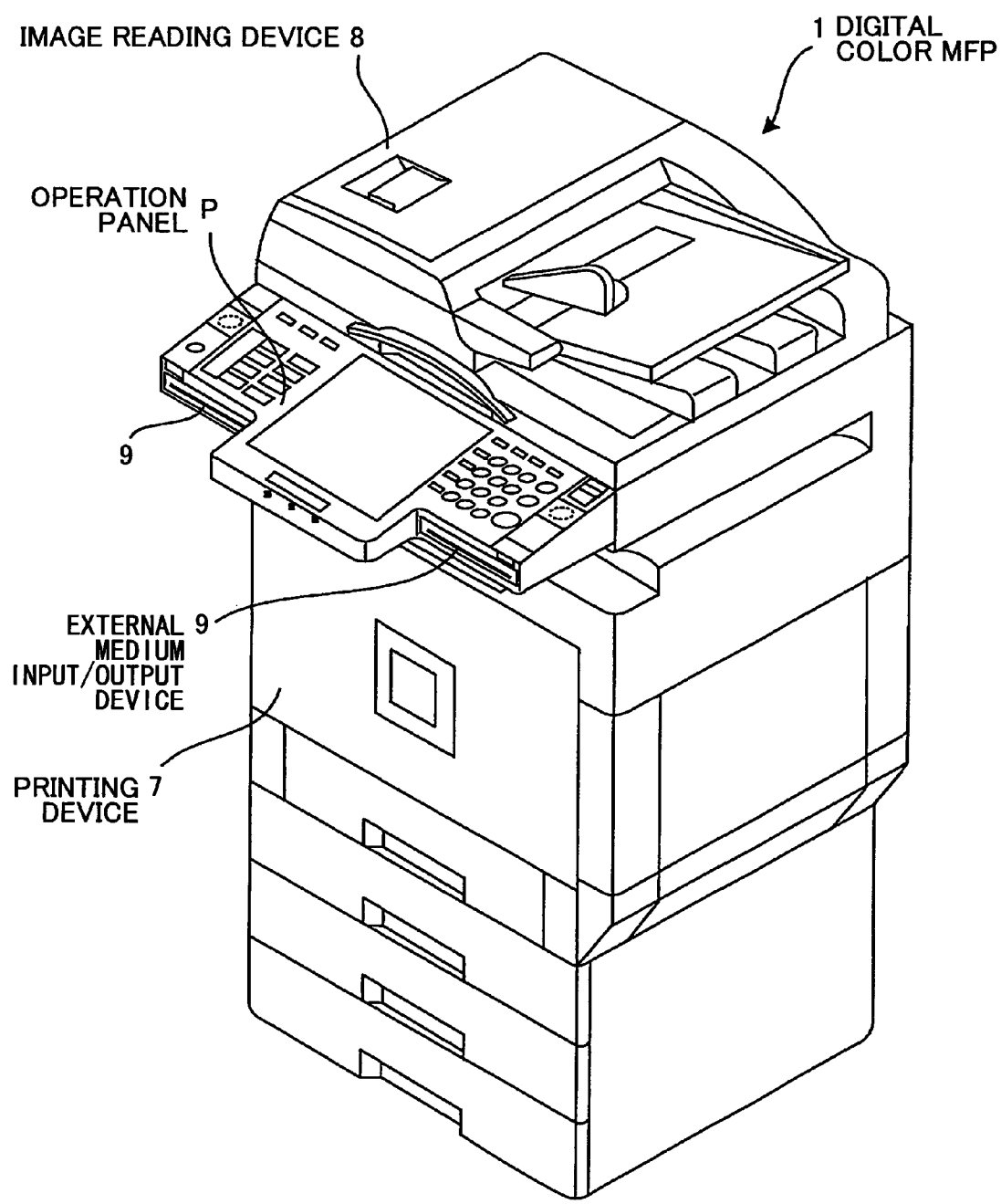
FIG. 1 roughly shows an outline perspective view of a digital color MFP as an image processing apparatus in an embodiment of the present invention.

According to an embodiment of the present invention, an image processing arrangement for creating an electronic file from a paper document with the use of an optical reading device, has a detecting part detecting a code included in image data read by means of the optical reading device; a data creating part decoding the code to obtain identification information, obtaining related information identified by the identification information, and obtaining character information from the related information, and creating character data from the character information; and a file creating part creating a document file storing the character data.

Further, in this image processing arrangement, the character data may be a keyword selected from the character information of the related information.

Further, in this image processing arrangement, when the related information obtained from the code has image information, the data creating part may once obtain character information by means of carrying out optical character recognition processing on the image information, and select a keyword from the thus-obtained character information.

Further, in this image processing arrangement, when the related information obtained from the code has multimedia information, the data creating part may once obtain the character information by means of reproducing the multimedia information to recognize character information therefrom, and select a keyword from the character information.

Further, in this image processing arrangement, the multimedia information may be stream data.

Further, in this image processing arrangement, the character data may be stored in at least one of a plurality of layers, when the document file has the plurality of layers.

Further, in this image processing arrangement, the character data may be stored in a text layer when the document file has the text layer and an image layer.

Further, in this image processing arrangement, the character data may be stored in the document file at a position on or the proximity of the position of the code in the image data.

Further, in this image processing arrangement, the detecting part may once extract a rectangle of the code from the read image data, and select an area of the code therefrom to decode.

Further, in this image processing arrangement, the identification information may be a URL of the Internet; and the related information may be a document located at the URL.

Further, in this image processing arrangement, the multimedia information may be at least one of a voice and a moving picture which comprises a telop as character information.

Further, in this image processing arrangement, the character data may be stored in an invisible layer when the document file has the invisible layer and a visible layer.

With reference to figures, embodiments of the present invention will now be described in detail. Further, in the embodiments of the present invention, a digital color MFP (Multi-Function Peripheral) acts as an image processing apparatus according to the present invention, which has, in a combined manner, a copy function, a facsimile function, a printing function, a scanner function, a function of delivering an input image (input in any of these functions), and so forth.

FIG. 1 roughly shows an outline perspective view of the digital color MFP as an image processing apparatus in an embodiment of the present invention. The digital color MFP 1 is configured so that, on a top of a printing device 7 acting as an image forming part forming an image on a medium such as transfer paper, an image reading device acting as an image reading part reading an image from an original, is disposed.

On an outer surface of the image reading device 8, an operation panel P making display to an operator and allowing various inputs such as function setting and so forth made by the operator, is provided. Further, to a bottom of the operator panel P, an eternal medium input/output device 9 is provided, which reads a program, image data or such from a removable storage medium M (not shown), or writing, in the removable storage medium M, a program, image data or such, in such a state in which an insertion mouth in which the removable storage medium M is inserted is exposed.

Figure 2:
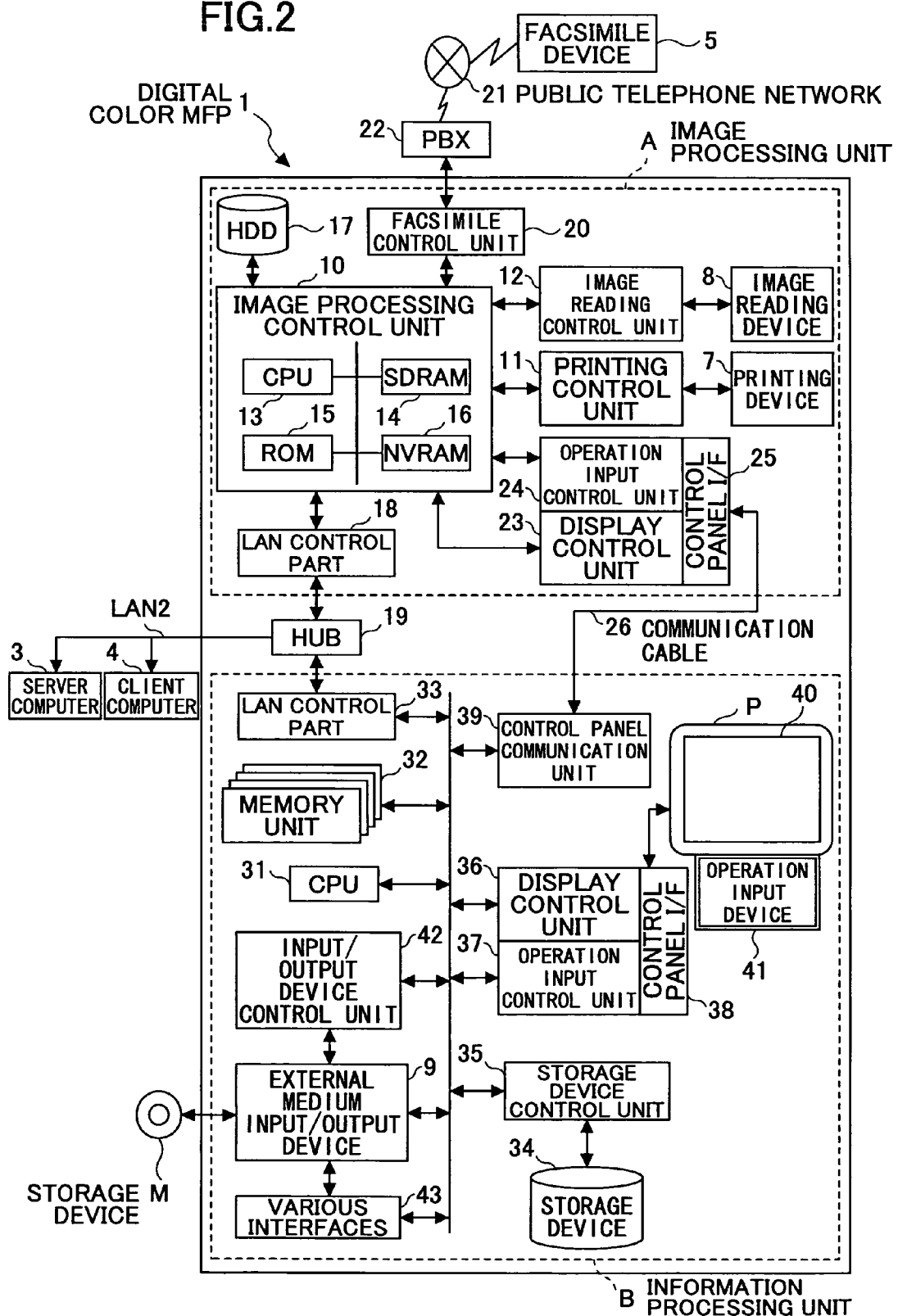
FIG. 2 roughly shows a block diagram of the digital color MFP in the embodiment.

FIG. 2 shows a block diagram roughly illustrating an internal configuration of the digital color MFP 1. As shown in FIG. 2, the digital color MFP 1 generally includes an image processing unit A and an information processing unit B. The printing device 7 and the image reading device 8 shown in FIG. 1 are included in the image processing unit A, while the operation panel P and the external medium input/output device 9 are included in the information processing unit B.

First, the image processing unit A will be described.

The image processing unit A has an image processing control unit 10 carrying out total control of image processing in the image processing unit A, and the image processing control unit 10 is connected with a printing control unit 11 controlling the printing device 7 and an image reading control unit 12 controlling the image reading device 8.

The printing control unit 11, under the control of the image processing control unit 10, outputs printing instructions including image data to the printing device 7, and causes the printing device 7 to form an image on a medium (paper or such) and output the same. The image reading control unit 12, under the control of the image processing control unit 10, drives the image reading device 8, to focus on a photoelectric device such as a CCD (charge coupled device) by means of mirrors and lenses reflected light coming from a surface of an original (paper or such) when light is applied to the surface of the original, to read the original and convert thus-obtained analog data into digital data, and generate digital image data having 8 bits for each of RGB.

The image processing control unit 10 includes a CPU (central processing unit) 13 which is a main processor, a memory device (for example, an SDRAM (synchronous dynamic random access memory)) 15b temporally storing image data read by means of the image reading device 8 to be then printed out by means of the printing device 7, a ROM (read only memory) 15b storing a control program or such, an NVRAM 16 recording a system log, system setting, log information and so forth, which has a function to hold data even when the power supply is turned off, and a bus connecting these devices together, so as to form a microcomputer.

To the image processing control unit 10, an HDD (hard disk drive) 17 as a storage for storing a large amount of image data, job histories and so forth, a LAN control part 18 connecting the image processing unit A to a LAN 2 via a HUB 19 which is a line concentrator provided in the apparatus, and a facsimile control unit 20 carrying out facsimile control, are connected. The facsimile control unit 20 is connected to a private branch exchange unit (PBX) 22 communicating with a public telephone network 21, and the digital color MFP 1 can communicate with a remote facsimile apparatus therethrough.

In addition, a display control unit 23 and an operation input control unit 24 are connected to the image processing control unit 10. The display control unit 23 outputs an image display control signal to the information processing unit B via a communication cable 26 connected to a control panel I/F 25 under the control of the image processing control unit 10, and carries out image display control of the operation panel P of the information processing unit B.

The operation input control unit 24 inputs an input control signal according to input operation such as function setting made by the operator from the operation panel P of the information processing unit B, via the communication cable 26 connected to the control panel I/F 25 under the control of the image processing control unit 10. That is, the image processing unit A is configured so that the operation panel P of the information processing unit B can be directly monitored via the communication cable 26.

Accordingly, the image processing unit A is configured so that, the communication cable 26 is connected from the image processing unit A the same as that included an image processing apparatus in the prior art, and therewith, the operation panel P of the information processing unit B is utilizable. That is, the display control unit 23 and the operation input control unit 24 of the image processing unit A operate as if they are connected to the operation panel P.

By such a configuration, the image processing unit A analyzes a command for providing printing data which is image information and printing instructions from the outside (a server computer 3, a client computer 4 via the LAN 2, and a facsimile apparatus 5 via the public telephone network 21, or such), expands the printing data in a bitmap state as output image data such that it can be printed out, and determines operation by obtaining a printing mode from the command. The printing data and the command are received via the LAN control part 18 or the facsimile control unit 20.

The image processing unit A has a function such as to transfer printing data, original reading data, output image data processed for being output as mentioned above, or compressed data thereof, stored in the SDRAM 14 or the HDD 17, to the outside (the server computer 3, the client computer 4, the facsimile apparatus 5 or such).

Next, the information processing unit B having the operation panel P will be described. The information processing unit B is configured as a microcomputer controlled by a general-purpose OS (operating system) the same as that used in an information processing apparatus generally called as a personal computer. The information processing unit B has a CPU 31 as a main processor. To the CPU 31, a memory unit 32 including a RAM used as a work area of the CPU 31, a ROM which is a read only memory storing a starting-up program or such, and a storage control unit 35 controlling input/output of data to/from the storage 34 such as a HDD storing the OS, an application program and so forth, are connected via a bus.

To the CPU 31, a LAN control part 33 for connecting the information processing unit B to the LAN 2 via the HUB 19 is connected. An IP address which is a network address given to the LAN control part 33 is different from an IP address given to the LAN control part 18 of the above-mentioned image processing unit A. That is, the digital color MFP 1 in the embodiment has the two different IP addresses. That is, the image processing unit A and the information processing unit B are connected to the LAN 2, and therewith, data exchange is allowed between the image processing unit A and the information processing unit B. Further, to the CPU 31, a display control unit 36 controlling the operation panel P and the operation input control unit 37 is connected.

Figure 3:
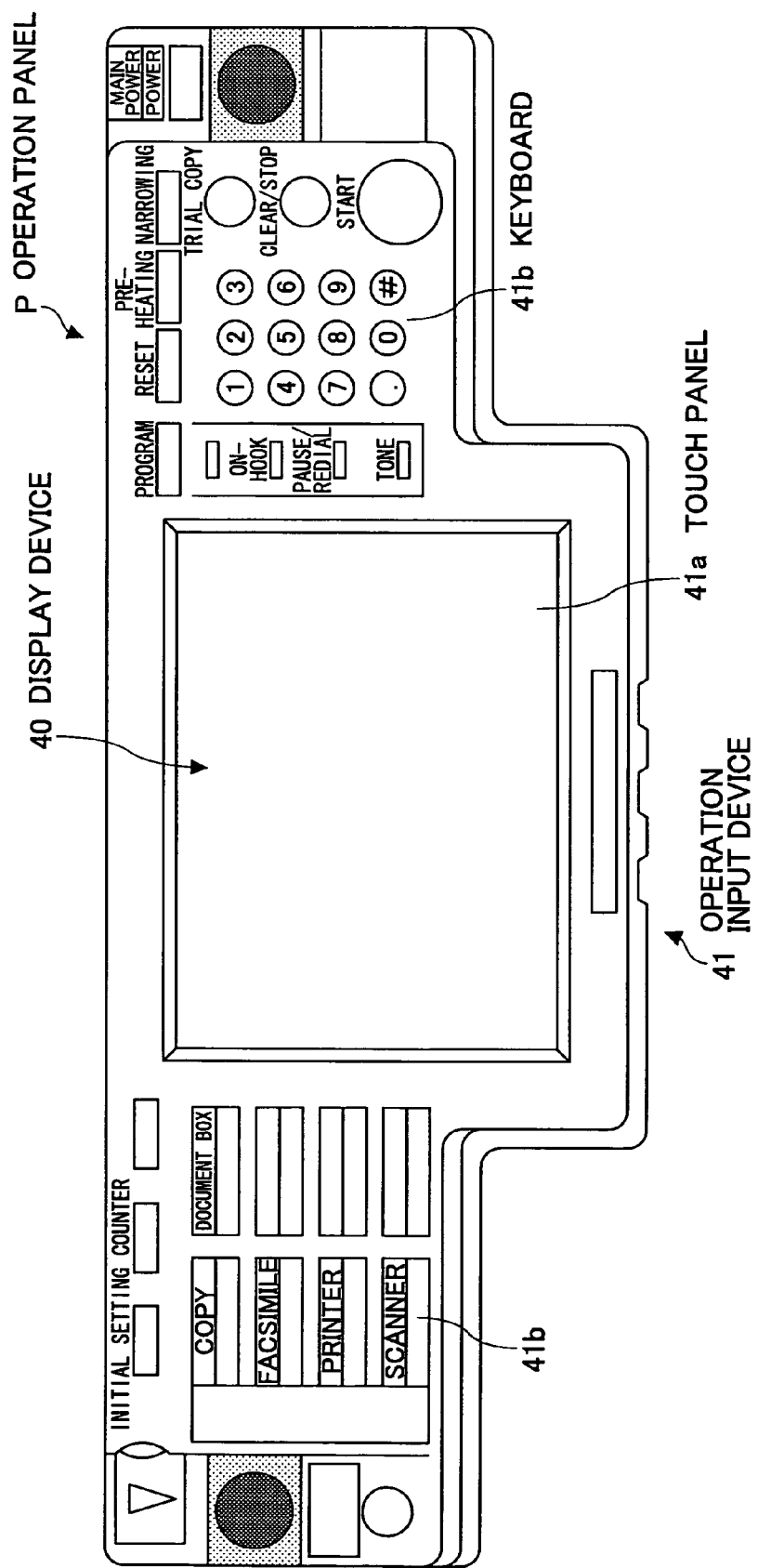
FIG. 3 shows a plan view of an operation panel of the digital color MFP in the embodiment of the present invention.

FIG. 3 shows a plan view of the operation panel P. As shown in FIG. 3, the operation panel P includes a display device 40 made of an LCD (liquid crystal device), and an operation input device 41. The operation input device 41 includes a touch panel 41a of a supersonic elastic wave way or such laminated on a surface of the display device 40 and a keyboard 41b having a plurality of keys. The keyboard 41b includes a start key declaring image reading start, a ten-key for inputting numerals, a reading condition setting key for setting an image data transmission destination, a clear key and so forth.

That is, the display control unit 36, as shown in FIG. 2, outputs an image display control signal to the display device 40 via the control panel I/F 38, and causes the display device 40 to display predetermined items according to the image display control signal. On the other hand, the operation input control unit 37 receives an input control signal according to function setting or input operation made by the operator from the operation input device 41, via the control panel I/F 38.

In addition, to the CPU 31, a control panel communication unit 39 is connected, which is connected with the control panel I/F 25 of the image processing unit A via the communication cable 26. The control panel communication unit 39 receives the image display control signal output from the image processing unit A, or transfers the input control signal according to function setting or input operation made by the operator from the operation panel P to the image processing unit A. It is noted that, although details will be described later, the image display control signal received by the control panel communication unit 39 from the image processing unit A is output to the display control unit 36 after undergoing data conversion for being handled by the display device 40 of the operation panel P.

Further, the input control signal according to the function setting or the input operation made by the operator from the operation panel P is converted in a data format suitable to the image processing unit A, and then, is input to the control panel communication unit 39. As described above, in the storage 34, the OS, the application program and so forth, executed by the CPU 31, are stored. In this view, the storage 34 functions as a recording medium storing the application program.

In the digital color MFP 1, when the operator starts power supply, the CPU 1 starts up the starting-up program from the memory unit 32, reads the OS from the storage 34 in the RAM of the memory unit 32, and starts up the OS. The OS thus started up carries out, according to operation made by the operator, starts up of a program, reads or stores information, or such. As a typical one of the OS, Windows (registered trademark) or such may be cited. The operation program running on the OS is called an application program. The OS of the information processing unit B is an OS the same as that of the external information processing unit (such as the server computer 3, the client computer 4 or such), i.e., a general-purpose OS (for example, Windows or such).

Figure 4:
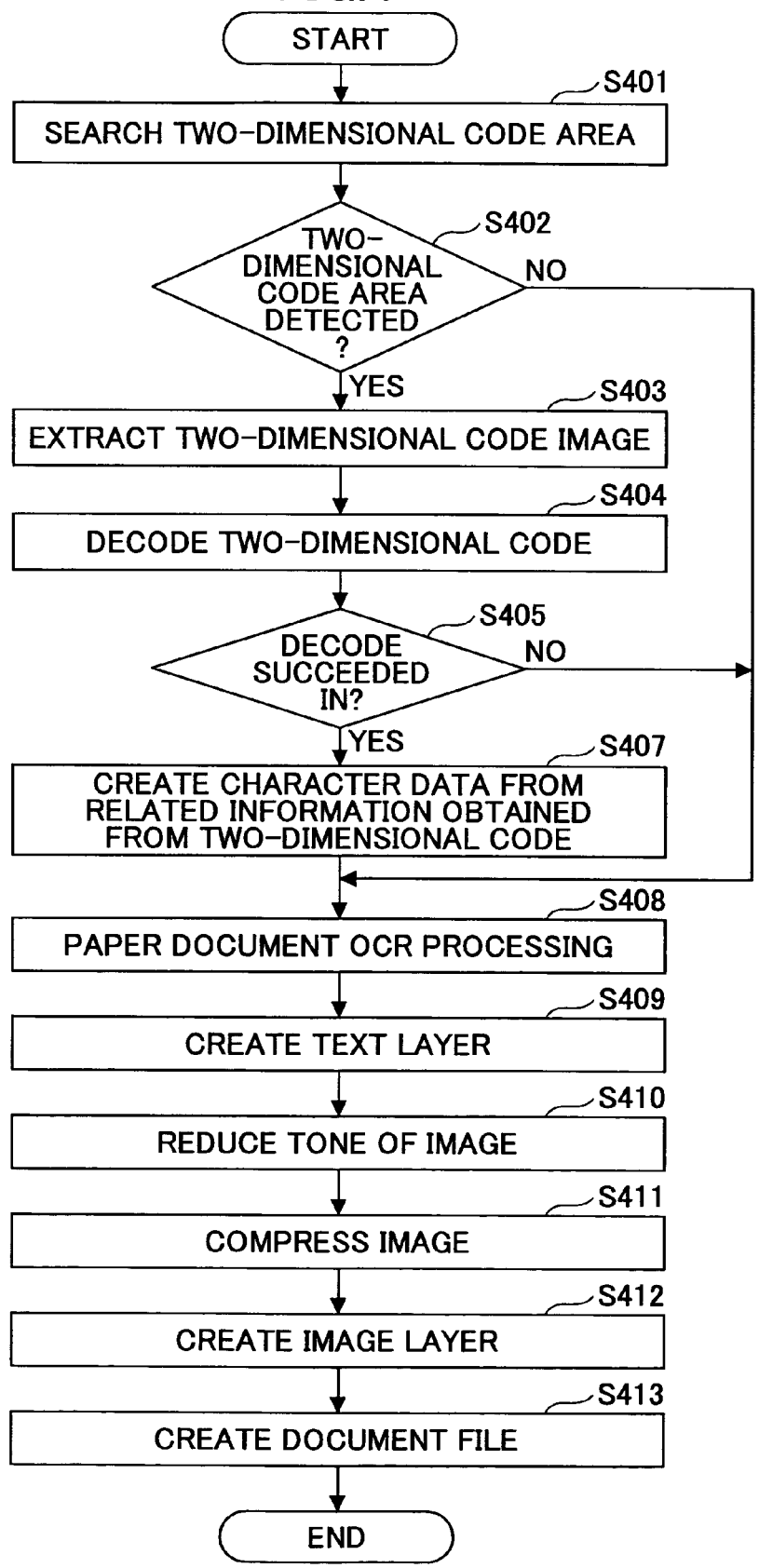
FIG. 4 shows a flow chart of processing for creating an electronic file from a paper document in an image processing apparatus in a embodiment 1 of the present invention.

FIG. 4 shows a flow chart of processing for creating an electronic file from a paper document after being scanned in an image processing apparatus in an embodiment 1 of the present invention. This image processing apparatus in the embodiment 1 is basically the same configuration as that of the above-described digital color MFP 1.

An area of a two-dimensional code included in an original (paper document) is searched for from image data read from the paper document (Step S401). This step of search is carried out to extract a rectangular area included in the image data. This two-dimensional code search operation will now be described with reference to FIG. 5 (a) through (d) for an example of a QR code image. FIG. 5 (a) shows a two-dimensional code area part of the image data obtained from image scanning. FIG. 5 (b) shows an image obtained from processing to extract contours from the data shown in FIG. 5 (a). In FIG. 5 (b), the contour parts are shown black, the other parts are shown white, and thus, it is a binary image. In this example, the contour images are obtained by means of a linear differentiation called 'Robert's operator' (for which, see 'Practical Image Processing Learned with C-language—for Windows, Macintosh and X-Window', page 41, co-written by Masaki Inoue, Masaki Hayashi, Koji Mitani, Nobuyuki Yagi, Eisuke Nakasu and Masato Okui, published by Ohmsha, magazine dept.). Detection of the rectangular areas is achieved by connecting, with rectangles, respective connecting parts of the contours. FIG. 5 (c) shows a state in which the connecting parts of the black parts, i.e., the contour parts are detected and enclosed by rectangles. Further, when the thus-obtained rectangular connecting parts are detected and thus a connecting rectangle is created therefrom, a state of FIG. 5 (d) is obtained. Thus, a single large rectangle is obtained, and thus, a rectangular area circumscribing the two-dimensional code is obtained. Further, since a QR code has a square shape according to the stranded, only one having a squire shape or the like should be extracted from among rectangular areas thus originally detected.

In Step S401 of FIG. 4, it is determined whether or not the two-dimensional code area has been thus detected. When the two-dimensional code area has been detected (Yes in Step S402), the two-dimensional code area image is extracted (Step S403). In this step, only the rectangle circumscribing the two-dimensional code is extracted, and therefrom, a new image is created. The thus-extracted two-dimensional code is then decoded (Step S404).

It is determined whether or not the decoding of the two-dimensional code in Step S404 has been succeeded in (Step S405). When it is determined that the decoding has been succeeded in (Yes in Step S405), character data is created from related information related to the decoding result (Step S406). A specific method for creating the character data in this step will be described later with reference to FIG. 6.

Further, when no two-dimensional code area has been detected (No in Step S402), or, when the decoding of the two-dimensional code has not been succeeded in (No in Step S405), Step S408 is then executed.

OCR processing is carried out on the entirety of the image data read from the paper document (Step S408). A result of the OCR processing includes character data including coordinate data of the characters. Further, a text layer is created from the thus-obtained character data (Step S409). The text layer is preferably in a format of HTML (Hyper Text Markup Language) or such, such that, characters' coordinate information can be embedded there. In this step, when the above-mentioned character image has been created from the related information related to the two-dimensional code in Step S407, this character data is also embedded at a position the same as or in the proximity of the coordinate position of the two-dimensional code, which has been retrieved in Step S401. Further, tone reduction is carried out on the image data read from the paper document (Step S410). That is, in a processing way according to setting made by the operator or according to a fixed set value, tone reduction processing such as that for index color, grayscale, black/white binary or such, is carried out.

Then, the image data is compressed (Step S411). That is, the image data is transformed into a compressed image format for the purpose of reducing the size of the read image data, such as JPEG (Joint Photographic Expert Group), MMR (Modified Modified Read), PNG (Portable Network Graphics) or such, and thus, an image layer is created (Step S412). Further, a document file is created (Step S413). As a format of the document file which is an electronic file, a PDF (Portable Document Format), which has come into wide use, may be applied. Thereby, it is possible to create a document file having a layer configuration. In this case, the image layer of the compressed image data is set as a visible layer and the text layer is set as an invisible layer in default setting. However, this setting for the visible/invisible layers may be freely changed (i.e., switched between these layers) when a reader actually views the document file, by means of, for example, Adobe Reader (made by Adobe Systems Inc.), which is a reading software for a PDF file, or such. In this regard, see a help menu of the Adobe Reader (registered trademark) 7.0, "to display a layer"; "PDF Reference", fifth edition, Adobe Systems Inc., page 5, 1.3 "Introduction of PDF 1.5 Features" of the following URL: "http://partners.adobe.com/public/developer/en/acrobat/s dk/pdf/pdf_creation_apis_and_specs/PDFReference.pdf", mentioning "The ability to selectively view or hide content in a PDF document (Section 4.10, "Optional Content" and "Set-OCG-State Actions" on page 629)"; and "HG/PscanServPlus" of URL "http://www.hypergear.com/pdf/pscanserv_plus_product.htm #05", pages 3-4, "OCR transparent text".

Figure 6:
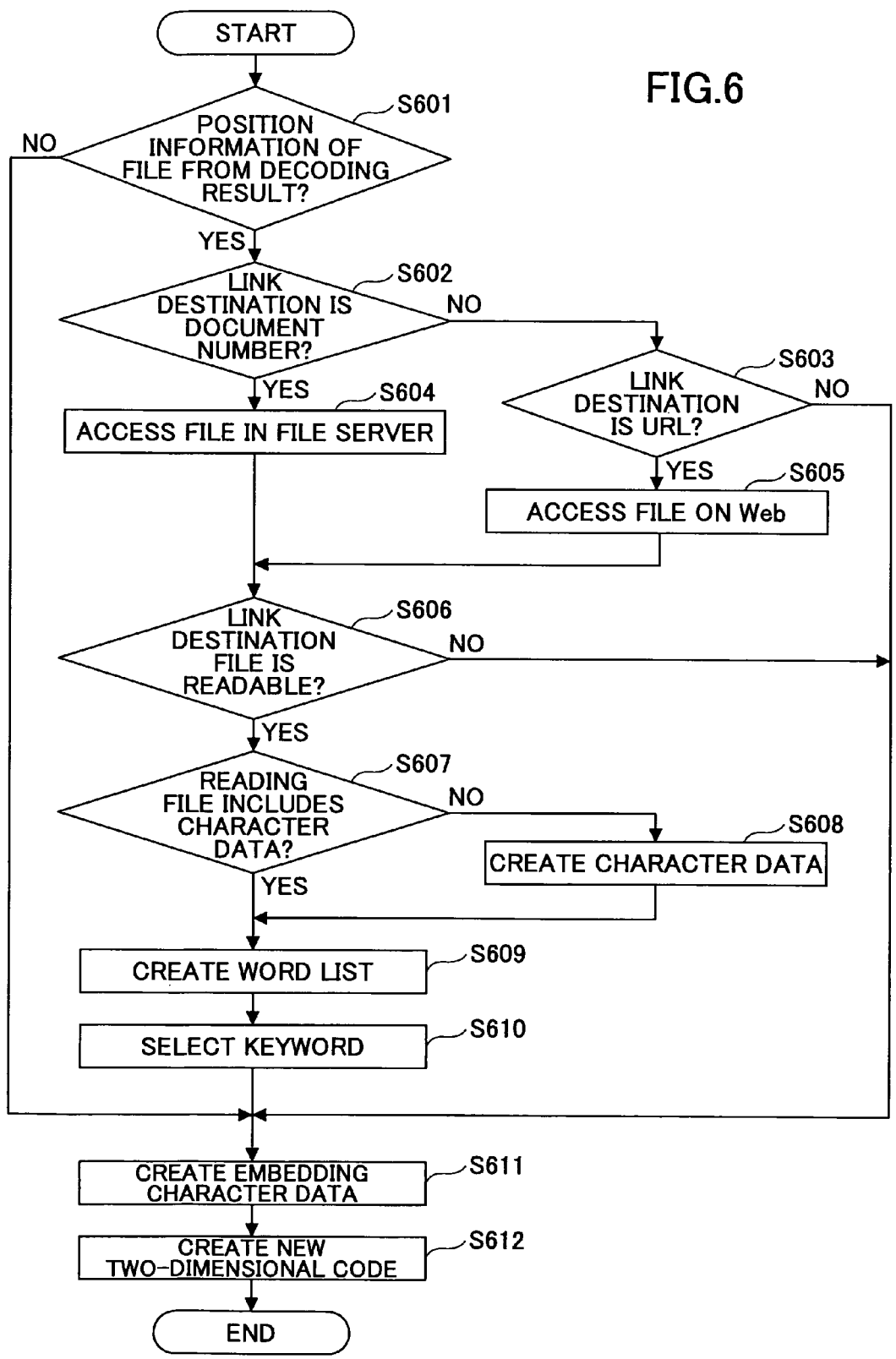
FIG. 6 shows a flow chart of character data creation from related information obtained from a two-dimensional code according to the embodiment 1.

FIG. 6 shows a flow chart illustrating creation of the character data from the related information related to the two-dimensional code, in Step S407 of FIG. 2. With reference to FIG. 6, creation of the character data is described.

It is determined whether or not the information obtained from decoding the two-dimensional code in Step S404 corresponds to position information indicating a location of a file (Step S601). When the information of the two-dimensional code does not correspond to position information (No in Step S601), Step S611 is executed, and character data directly obtained from the decoding the two-dimensional code in Step S404 is used in Step S407.

On the other hand, when the information thus decoded from the two-dimensional code in Step S404 corresponds to the position information indicating a location of a file (Yes in Step S601), it is determined whether or not the position information for a file corresponds to a document number (Step S602). The document number means, for example, a unique number, which has been attached to the paper document in a system in which a printer linked with a file server attaches such information in a form of two-dimensional code indicating a consecutive number in an arbitrary number of figures to a document to be printed out.

When the position information corresponds to a document number (Yes in Step S602), the corresponding file is searched for from the above-mentioned file server and then is accessed (Step S604). On the other hand, when the position information is not such a document number (No in Step S602) but the decoded result in Step S404 of FIG. 4 corresponds to a URL (Yes in Step S603), the image processing apparatus accesses a file indicated by the URL on the Web (the Internet) (Step S605).

It is determined in Step S606 whether or not the thus-accessed file (accessed in Step S604 or S605) can be actually read. When the file can be actually read (Yes in Step S606), it is determined in Step S607 whether or not the thus-read file includes character data. When the file includes no character data (No in Step S607), OCR processing or such is carried out on the file, so as to obtain character data (Step S608). In this step, in order to obtain character data from the file, i.e., to obtain character data from related information corresponding to the file, the file of the related information is converted into text, and thus, the thus-obtained character data is used. This processing of actually obtaining the character data will be described later.

Then, words are searched for from the character data thus obtained in Step S607 or S608, and then, a ranking list of the words is created in an order of a larger number of times of occurrences (Step S609). Next, specific words are selected from the ranking list (Step S610).

With reference to FIG. 7, the selection of words from the ranking list in Steps S610 will be described.

Extraction of words in this process is made according to a predetermined extraction requirement. For example, in the embodiment 1, as shown in FIG. 7, only keywords should be first extracted. FIG. 7 partially shows a list listing the top ten candidates which occur the largest numbers of times in the file of the related information, filling the above-mentioned extraction requirement.

In FIG. 7, the word "skyscraper" occurs four times (largest number of times), "tone" occurs thrice (second largest number of times), "taxi" occurs thrice (second largest number of times), "yellow" occurs twice (fourth largest number of times), . . . , "skyscraper" occurs once (tenth largest number of times), in the file of the related information.

The predetermined extraction requirement is not limited the above-mentioned, and, for another example, one in which only words of a combination between katakana characters and Chinese characters should be first extracted, may be applied.

FIGS. 15A, 15B, 16A, 16B and 16C partially show an example of the above-mentioned file of the related information, which is available for example at the URL encoded in the above-mentioned original two-dimensional code 1001 included in the original paper document.

A person who has originally created this paper document has created the document with reference to this file of the related information, and then, has attached the two-dimensional code 1001 of the URL of the file of the related information. In fact, in the part of the file of the related information shown in 15A, 15B, 16A, 16B and 16C, the above-mentioned words "skyscraper" K1, K2, "tone" K4 and "taxi" K3 occur.

In the embodiment 1, the words up to the top three candidates are selected from the ranking list, as keywords. In this example of FIG. 7, the three words, i.e., "skyscraper", "tone" and "taxi", are ranked as the top three candidates, and thus, they are selected as the keywords.

Then, in the area of the two-dimensional code of the image data read from the paper document, the keywords thus selected from the character data based on the related information related to the two-dimensional code are embedded, and thus, the character data is created (Step S611). Further, a new two-dimensional code is created from the data decoded from the original two-dimensional data in Step S404 of FIG. 4, as well as the keywords thus selected in Step S610, added together (Step S612). It is noted that, in the visible layer of the document file created in Step S413 of FIG. 4, the thus-created new two-dimensional code is overwritten at the position of the area at which the original two-dimensional code has existed, as searched for in Step S401.

Figure 8:
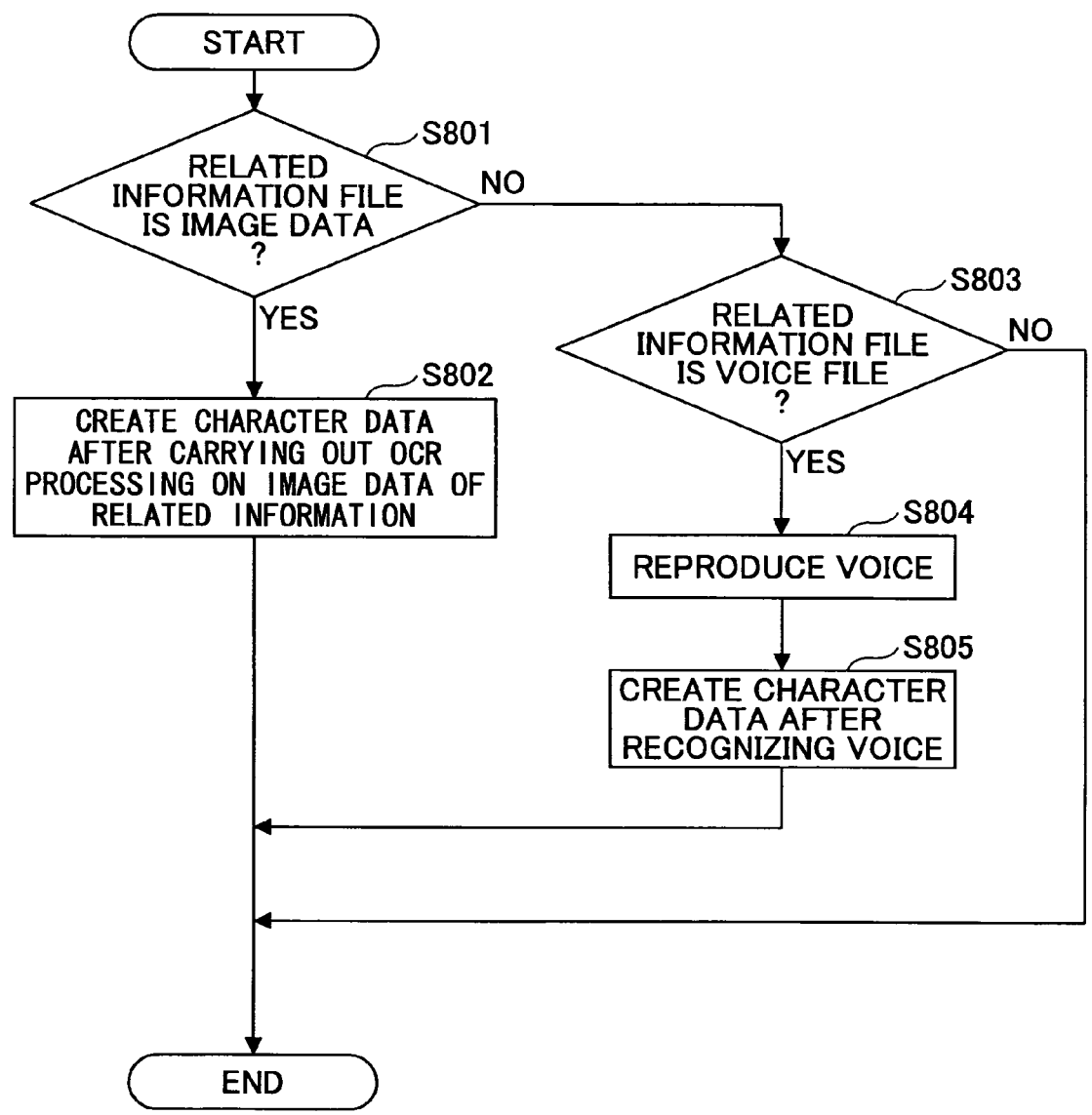
FIG. 8 shows a flow chart of character data creation for when character data is not directly included in related information in the embodiment 1.

Further, FIG. 8 shows a flow chart for when the file of the related information does not include character data (No in Step S607, Step S608 of FIG. 6), where character data is then created from the file of the related information.

First, in order to determine whether or not the file of the related information corresponds to character information, a file format is determined from an extension of the file name. For this purpose, it is determined whether or not the file of the related information is of image data such as BMP, JPEG or such (Step S801). When the file of the related information corresponds to image data (Yes in Step S801), OCR processing is carried out on the file of the related information, and thus, character information is created therefrom (Step S802).

On the other hand, when the file of the related information does not correspond to image data (No in Step S801), it is determined in Step S803 whether or not the file of the related information corresponds to voice data. When the file corresponds to voice data (Yes in Step S803), the voice data is reproduced by means of a voice recognition means, for example, software of Via Voice (made by IBM) (Step S804). Then, the character data is created from the voice recognition result obtained through voice recognition processing (Step S805).

When a format of the file of the related information corresponds to neither image data nor voice data (No in Step S803), no character data is output, and the processing is finished.

It is noted that, it is also possible to create the character data from the file of the related information when the file of the related information corresponds to moving picture data (No in Step S803), in a case where the moving picture data (stream data) includes a telop, from which the character data is available by means of OCR processing or such as in Step S802. In this case, the character data is available in Step S608 of FIG. 6.

Thus, according to the embodiment 1 of the present invention, when a document file of a form of an electronic file is created from image data optically read from a paper document, keywords obtained from related information (a file or such) related to a two-dimensional code included in the paper document, are embedded in the document file. As a result, when full-text search is made, the keywords thus newly embedded in the document file are subject to the search. As a result, the thus-created electronic file itself can be thus retrieved (hit) in the full-text search. Thus, it is possible to achieve full-text search with improved usefulness.

Figure 9:
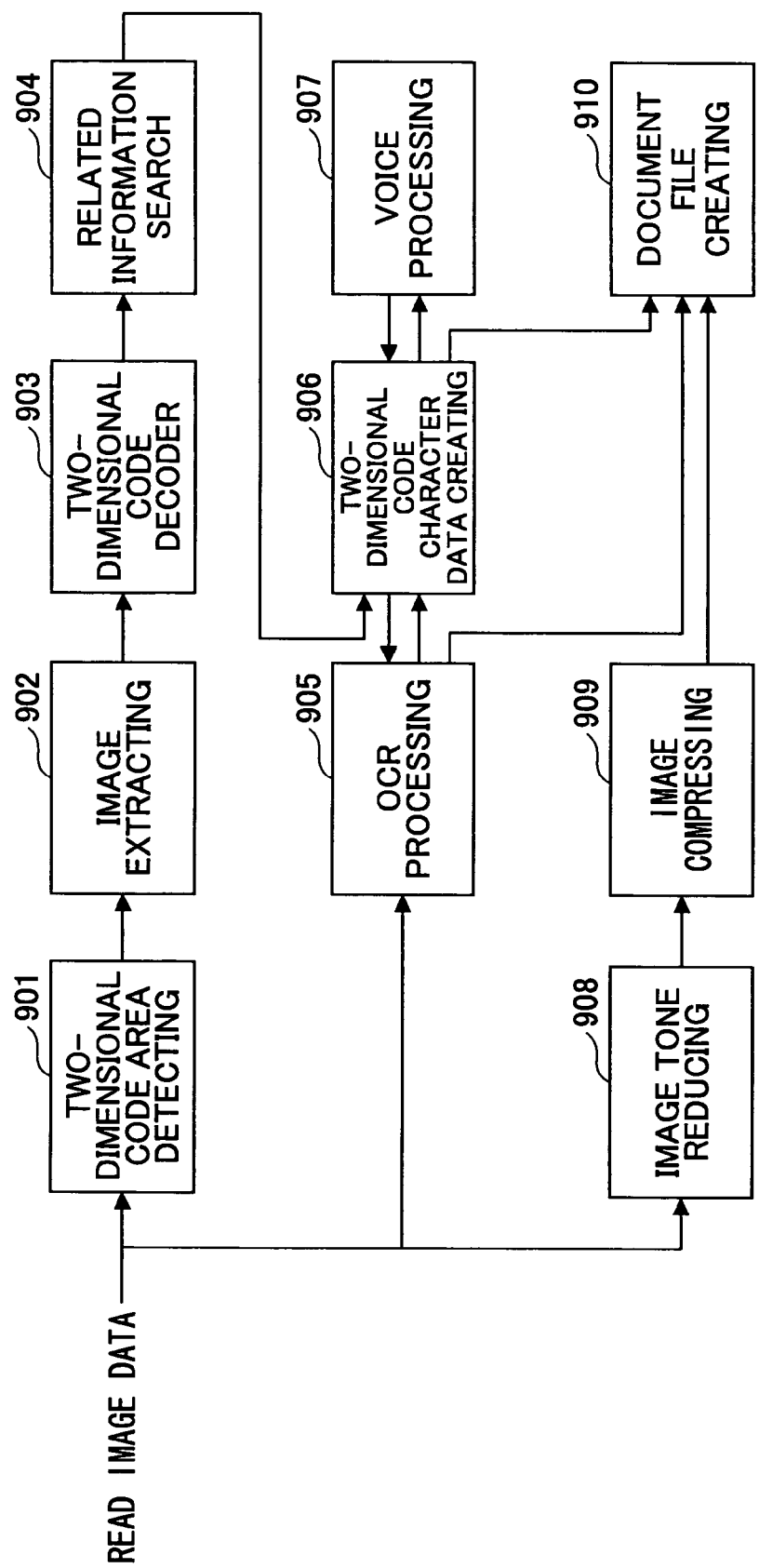
FIG. 9 roughly shows a block diagram of a configuration of the image processing apparatus in the embodiment 1.

FIG. 9 shows a block diagram of a general configuration of the image processing apparatus in the embodiment 1. Arrows shown in FIG. 9 merely shows examples of flows of data, and do not limit the functions. Image data optically read (scanned) from a paper document undergoes determination as to whether or not a two-dimensional code exists in a two-dimensional code area detecting part 901. An image extracting part 902 is a module to extract an area determined as having a two-dimensional code, and outputs an image extracted from the two-dimensional code area, to a two-dimensional code decoder 903.

The two-dimensional code decoder 903 converts the two-dimensional code into character data, and outputs the same to a related file search part 904. The related file search part 904 determines whether or not the thus decoded character data corresponds to file position information, and searches for a corresponding file if it does. Also, when the thus-obtained corresponding file includes character information, the thus-obtained character information is output to a two-dimensional code character data creating part together with the file thus obtained from the search.

When receiving no character information from the related file search part 904, the two-dimensional code character data creating part 906 outputs the related file obtained from the related file search part 904, to an OCR processing part 905 or a voice processing part 907, depending on a particular format of the related file, and obtains character information therefrom as a result of the corresponding processing there. Then, the two-dimensional code data creating part 906 carries out word search on the thus-obtained character information, creates a ranking list of keywords according to the number of times of occurrences, extracts the keywords, converts them into character data, and output the same to a document file creating part 910.

The OCR processing part 905 carries out OCR processing on image data read from the paper document, and outputs the OCR result to the document file creating part 910. An image tone reducing part 908 reduces the number of tones of the image data into an appropriate number of tones, and outputs a thus-obtained tone-reduced image data to an image compressing processing part 909. The image compressing processing part 909 compresses the given image data into an appropriate format, to create compressed image data, and outputs the same to the document file creating part 910.

The document file creating part 910 combines the given compressed image data, the character data obtained from the OCR processing or the character data based on the related information related to the two-dimensional code, in a document file, and, thus, creates the document file of a multi-layer format such as a PDF, for example.

FIG. 10 (*a*) shows image data read from a paper document in the embodiment 1, FIG. 10 (*b*) shows character data in an electronic file and FIG. 10 (*c*) shows image data in the electronic file. In FIG. 10 (*a*), a two-dimensional code 1001 which is attached to the image data thus read, is shown. FIG. 10 (*b*) shows a text layer in the electronic file, in which, character data 1002, (which is extracted from file contents of related information obtained from a result of decoding of the two-dimensional code 1001), is embedded at a position the same as a position where the two-dimensional code 1001 exists in the image data of FIG. 10 (*a*). The other character data included in the text layer shown in FIG. 10 (*b*) is that obtained from OCR processing carried out on the read image data shown in FIG. 10 (*a*). Further, FIG. 10 (*c*) corresponds to an image layer in the electronic file obtained from white/black binarization processing or such, carried out on the read image data shown in FIG. 10 (*a*). The thus-created electronic file is a document file of a multi-layer format including a visible layer of the image layer shown in FIG. 10 (*c*) and an invisible layer of the text layer shown in FIG. 10 (*b*).

A two-dimensional code 1003 in the image data shown in FIG. 10 (*c*) is a new two-dimensional code created (newly encoded) in Step S612 of FIG. 6. Thereby, it is possible to prevent an error from occurring, which error might otherwise occur when the two-dimensional code, re-printed after degrading occurring through processing in the image tone reducing processing part 908 and the image compressing processing part 909 of FIG. 9, carried out on the original two-dimensional code, were used in the document file and then where decoded. Further, the contents obtained from decoding the original two-dimensional code 1001 are also included in the new two-dimensional code 1003. Accordingly, it is possible to obtain the related information in more detail, by accessing the related information from information decoded from the new two-dimensional code 1003.

In the above-mentioned example, the text layer of FIG. 10 (*b*) is set as the invisible layer and the image layer of FIG. 10 (*c*) is set as the visible layer in the multi-layer format. However, it is also possible that only a single layer is included in which the image part of the image layer is included in the text layer of the character data in another embodiment. Further, it is also possible to include more than two layers in the multi-layer format in further another embodiment.

Figure 11:
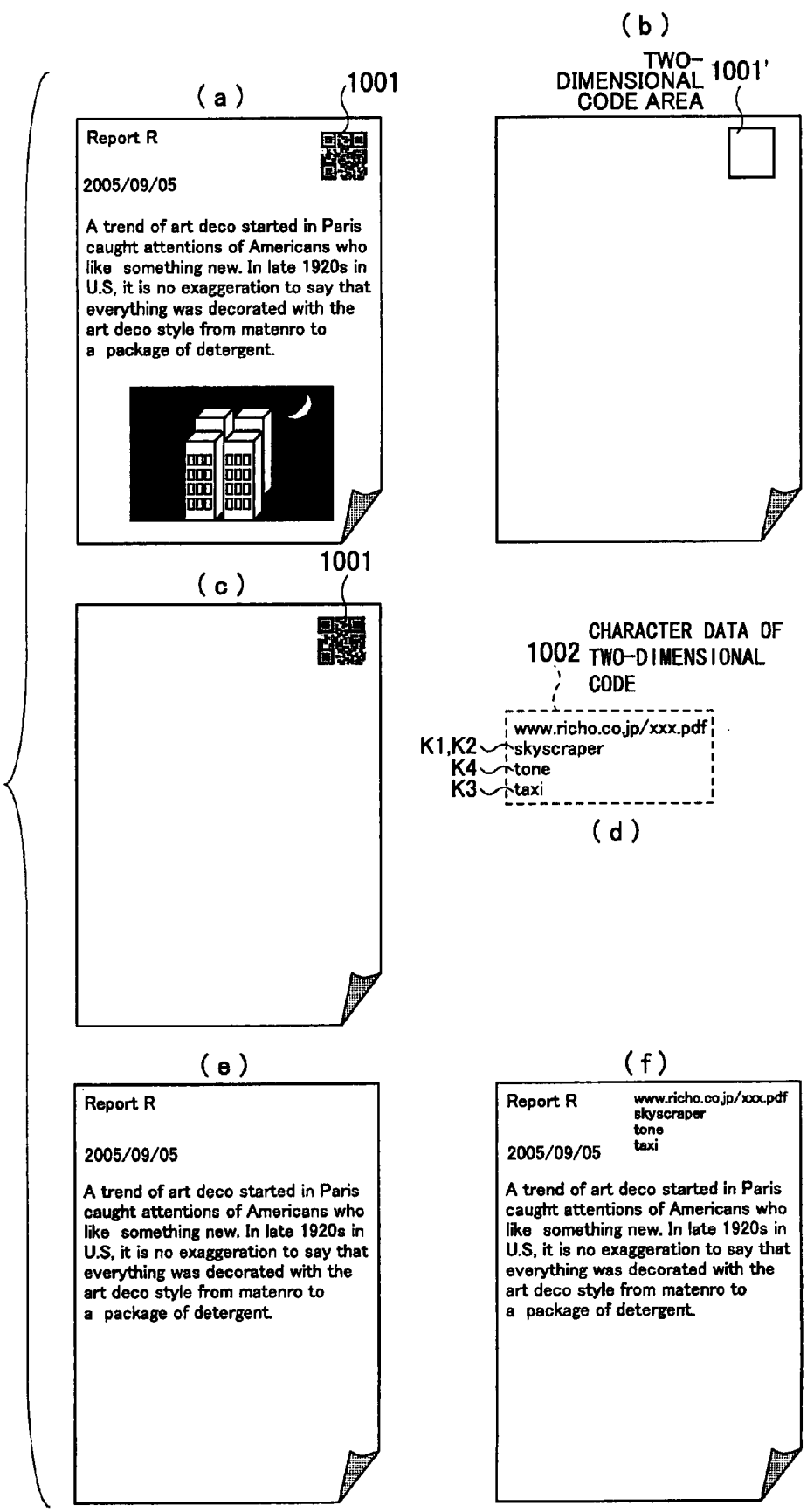
FIG. 11 diagrammatically shows process of image processing for the text layer created in the embodiment 1.

FIG. 11 (*a*) through (*f*) diagrammatically shows the process of image processing for the text layer created in the embodiment 1. FIG. 11 (*a*) shows the read image data having the two-dimensional code 1001. The image processing apparatus obtains the area 1001' of the two-dimensional code 1001 by means of the processing to detect the same (see FIG. 11 (*b*)). Then, the image is created (see FIG. 11 (*c*)) extracting the two-dimensional code 1001 from the read image data of FIG. 11 (*a*), with the use of the two-dimensional code area 1001'.

The two-dimensional code 1001 is transformed into character data by means of the two-dimensional code decoder 903 (see FIG. 9). Further, from the result of search of the file of the related information, keywords corresponding to words occurring the large numbers of times in the file are obtained, the thus obtained words are added, and thus, character data 1002 is obtained, together with character data decoded from the original two-dimensional code 1001 in the read image data of FIG. 11(*a*) (see FIG. 11 (*d*)).

The read image data is on the other hand undergoes OCR processing by the OCR processing part 905, and thus character data is obtained from the OCR processing carried out on the character part of the read image data (see FIG. 11 (*e*)). To this character data of FIG. 11 (*e*), the character data of FIG. 11 (*d*) is added, and thus, the text layer is created (see FIG. 11 (*f*)).

Thus, in the embodiment 1 of the present invention, a document file in a form of an electronic file including character data of an original paper document and character data of a two-dimensional code can be created, and, then, upon full-text search, also character data obtained from related information, related to the original paper document, which is thus included in a new two-dimensional code included in the document file, can be made to serves as a target for the search.

That is, if the word "skyscraper" is used as a keyword in the full-text search, the original paper document shown in FIG. 11 (*a*) is not hit since the paper document does not include the word "skyscraper" even when the search includes decoding of the two-dimensional code 1001 of the paper document since the original two-dimensional code 1001 only includes the information of, for example, the URL of the file of the related information mentioned above with reference to FIGS. 15A, 15B, 16A, 16B and 16C, and, thus, does not directly include the word "skyscraper". In contrast thereto, the newly created document file includes the word "skyscraper" K1, K2, in the form of the new two-dimensional code 1002 as shown in FIGS. 10 (*b*), 11 (*d*) and (*f*). Accordingly, this document file can be hit in the above-mentioned full-text search when the search includes decoding of such a two-dimensional code.

Figure 12:
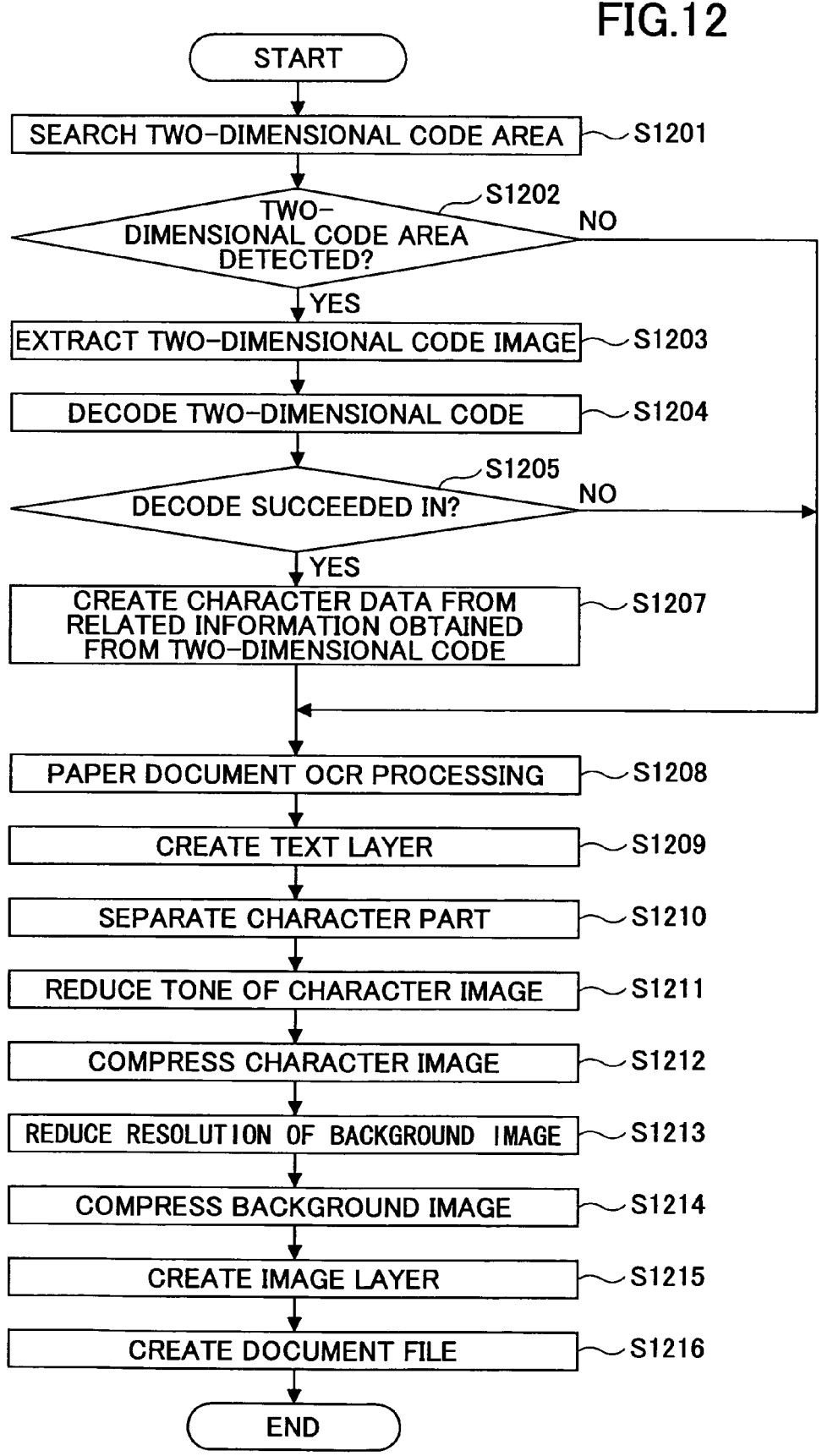
FIG. 12 shows a flow chart of processing of separating image data into a character image and a background image from the image data read from a paper document in an image processing apparatus in an embodiment 2 of the present invention.

FIG. 12 shows a flow chart in an image processing apparatus in an embodiment 2 of the present invention for processing in which image data read from a paper document is processed in such a manner that the image data is separated into a character image and a background image. With reference to FIG. 12, the processing according to the embodiment 2 will be described in which different compression is applied to the character part and the background part of the read image data.

A two-dimensional code area, included in an original, is searched for from the read image data (Step S1201). This detection is, the same as the above-described embodiment 1, rectangular areas are extracted from the image data. It is determined in Step S1202 whether or not the two-dimensional code exists. When the two-dimensional code area is detected (Yes in Step S1202), the two-dimensional code image is extracted (Step S1203). This extraction processing is to create new image data extracting only a rectangle circumscribing the two-dimensional code. The thus extracted two-dimensional code is decoded (Step S1204). Further, when no two-dimensional code has been detected in Step S1202 (No in Step S1202), Step S1208 is then executed.

It is determined in Step S1205 whether or not decoding of the two-dimensional code in Step S1204 has been succeeded in. When the decoding has been succeeded in (Yes in Step S1205), processing based on the decoding result is carried out (Step S1207). In Step S1207, character data is created from related information related to the two-dimensional code. This processing is the same as that described above for Steps S601 through S612 of FIG. 6. After that, even when the related information related to the two-dimensional code is an image, voice or such, character data is created therefrom. The means for creating the character data is the same as that described above for Steps S801 through S805 in FIG. 8.

Next, OCR processing is carried out on the entirety of the image of the read image data, except the two-dimensional code (Step S1208). A result of the OCR processing includes character data including coordinate data of characters. A text layer is created from this character data (Step S1209). Further, character parts are extracted from the thus-read image, and thus, the image is separated into the character image and a background image (Step S1210). Further, tone reduction is carried out on the character image (Step S1211), and then, the character image is compressed (Step S1212). When the compression tone reduction is for index color, PNG may be applied, when the compression tone reduction is for white/black binary, MMR-TIFF (MMR-Tagged Image File Format) may be applied, or so.

Further, resolution reduction processing is carried out on the separated background image (Step S1213). The resolution reducing processing is carried out for the purpose of reducing the size of the background image. Then, the background image is compressed (Step S1214). Since the background image may have many tones such as a photograph or such, JPEG suitable for expressing many tones may be applied.

An image layer is created from the thus processed character image and the background image (Step S1215). After that, a document file is created (Step S1216). A format of the document file is preferably PDF since it is possible to use a function such that the character image may be made transparent. In the image layer, a first visible layer created from the background image, and thereon, a second visible layer created from the character image having a transparent color other than the characters, is overlaid. Further, as the invisible layer (text layer), both the character data of the OCR result from the character image and the other character data obtained from the related information related to the two-dimensional code are included. As a result, it is possible to create the document file which has improved visibility and also which includes the character data, and thus, it is possible to provide the document file suitable for full-text search.

Figure 13:
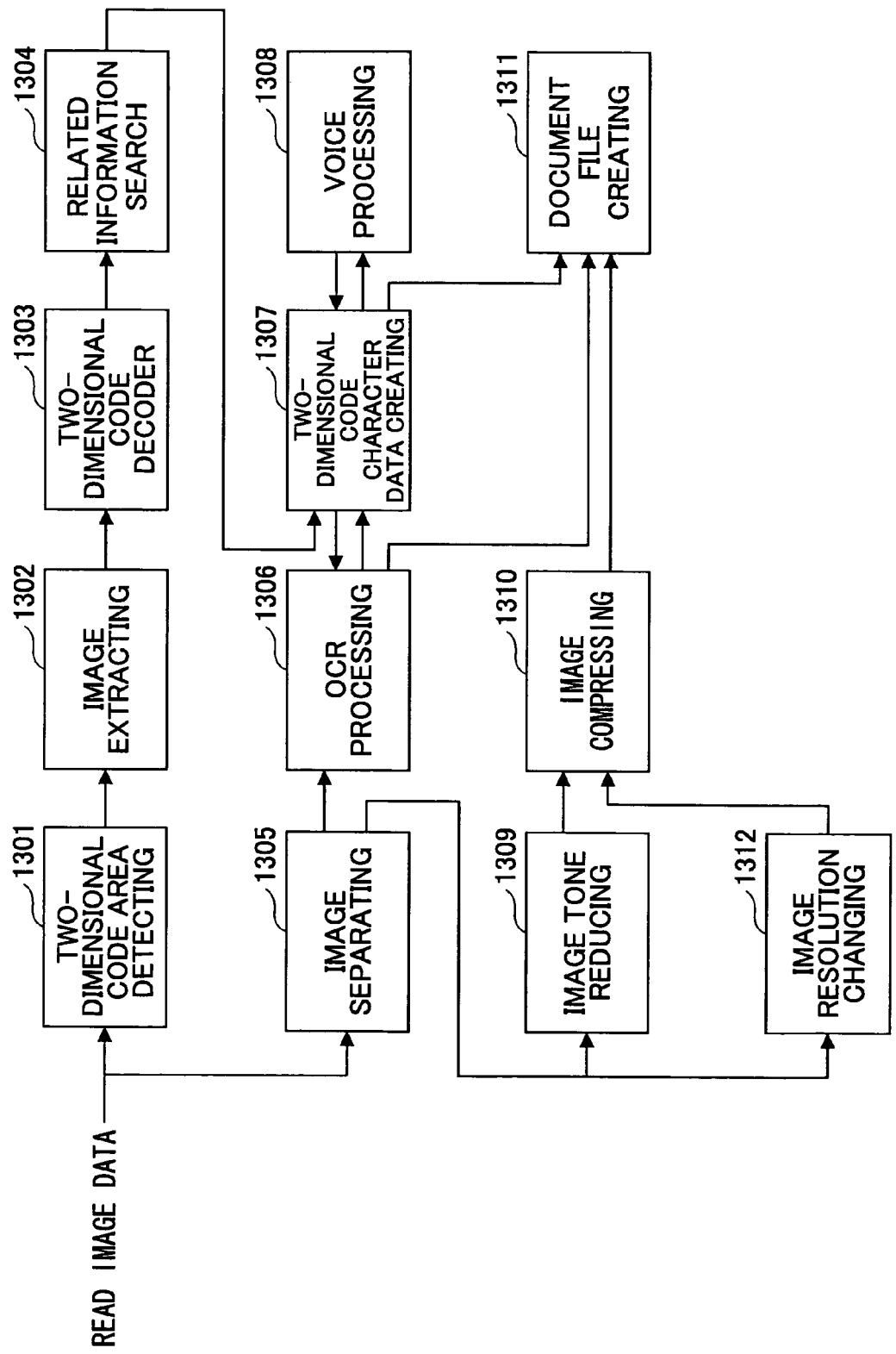
FIG. 13 roughly shows a block diagram of a configuration of the embodiment 2.

FIG. 13 shows a block diagram generally illustrating the image processing apparatus in the embodiment 2. Image data optically read (scanned) from a paper document undergoes determination as to whether or not a two-dimensional code exists in a two-dimensional code area detecting part 1301. An image extracting part 1302 is a module to extract an area determined as a two-dimensional code, and outputs an image extracted from the two-dimensional code area, to a two-dimensional code decoder 1303.

The two-dimensional code decoder 1303 converts the two-dimensional code into character data, and outputs the same to a related file search part 1304. The related file search part 1304 determines whether or not the decoded character data corresponds to file position information, and searches for a corresponding file if it does. Also, when the thus-obtained corresponding file includes character information, the thus-obtained character information is output to a two-dimensional code character data creating part 1307 together with the file thus obtained from the search.

When receiving no character information from the related file search part 1304, the two-dimensional code character data creating part 1307 outputs the related file obtained from the related file search part 1304, to an OCR processing part 1306 or a voice processing part 1308, depending on a particular format of the related file, and obtains character data therefrom as a result of the corresponding processing. Then, the two-dimensional code data creating part 1307 carries out word search on the thus-obtained character information, creates a ranking list of keywords according to the number of times of occurrences, extracts the keywords, converts them into character data, and output the same to a document file creating part 1311.

The OCR processing part 1306 carries out OCR processing on image data read from the paper document, and outputs the OCR result to the document file creating part 1311. An image separating part 1305 separates the read image data into a character image and a background image. An image tone reducing part 1309 reduces the number of tones into an appropriate number of tones, and outputs a thus-obtained tone-reduced image data to an image compressing processing part 1310. The image compressing processing part 1310 compresses the given image data into an appropriate format for the purpose of reducing the size of the background image.

The image compressing processing part 1310 compresses the character image and the background image into appropriate formats, to create compressed image data, and outputs the same to the document file creating part 1311. The document file creating part 1311 combines the given compressed image data including the character image and the background image, and the character data obtained from the OCR processing or the character data based on the related information related to the two-dimensional code, in a document file, and, thus, creates the document file of a multi-layer format such as a PDF, for example.

Thus, also in the embodiment 2 of the present invention, upon full-text search of a document file in an electronic file created from a paper document, information obtained from related information related to the original paper document, i.e., information of support documentation or such, which is thus included in a new two-dimensional code included in the document file, can be made to act as a target for the search.

Thus, according to the embodiment 2 of the present invention, when a document file of a form of an electronic file is created from image data optically read from a paper document, character data obtained from related information (a file or such) related to a two-dimensional code included in the paper document are embedded in the document file. As a result, when full-text search is made, the character data thus newly embedded in the document file can act as a target for the search. As a result, the thus-created electronic file itself can be thus retrieved (hit) in the full-text search. Thus, it is possible to achieve full-text search with improved usefulness.

With reference to FIGS. 14A through 14D, a scene where any of the above-described embodiments of the present invention is actually applied, will now be described.

Figure 14A:
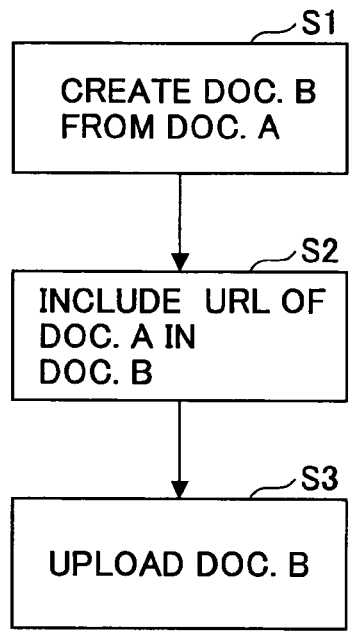
FIG. 14A shows a flow chart of creating a document B.

First, in the related art, as shown in FIG. 14A, a first person creates an original document B citing a given document A which corresponds to related information (Step S1). Then, this first person attaches an URL of the document A (related information), from which the document A is available in the Internet, to the document B in a form of a QR code encoding the characters expressing the URL (Step S2). Then, the first person uploads the document B in the Internet to act as a target for full-text search.

Figure 14B:
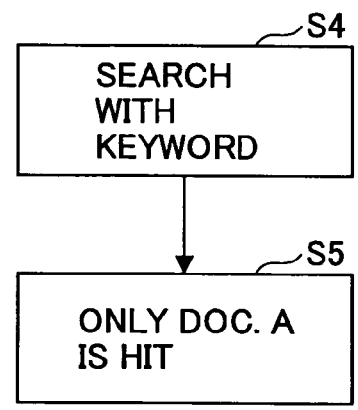
FIG. 14B shows a flow chart of searching in the case of FIG. 14A.

Then, in FIG. 14B, a second person carries out full-text search from the Internet, with a keyword, for example, the above-mentioned word "skyscraper" (Step S4).

This word "skyscraper" is included in the document A (related information), but is not included in the document B, and only the URL of the document A is included in the document B in the QR code as mentioned above. Even when the search includes decoding the QR code included in the document B to obtain the URL of the document A, the search does not include search of the document A itself therefrom, which is the URL destination, and thus, the document B is not hit, and only the document A is hit.

Figure 14C:
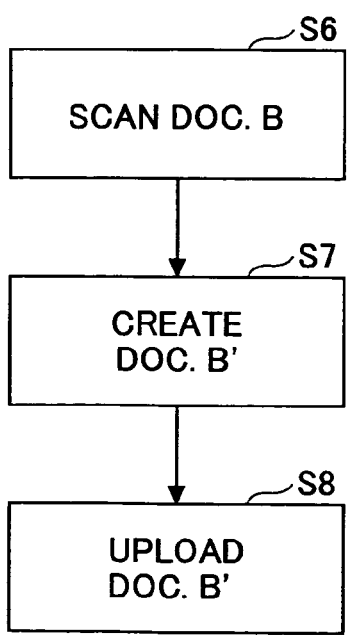
FIG. 14C shows a flow chart of creating a document B' from the document B.
Figure 14D:
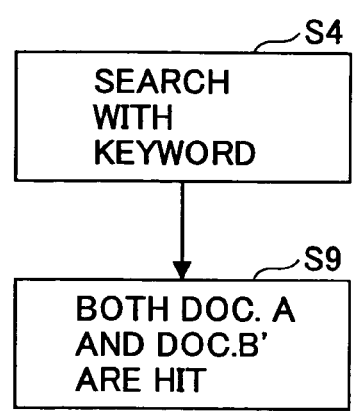
FIG. 14D shows a flow chart of searching in the case of FIG. 14C.
Figure 15A:
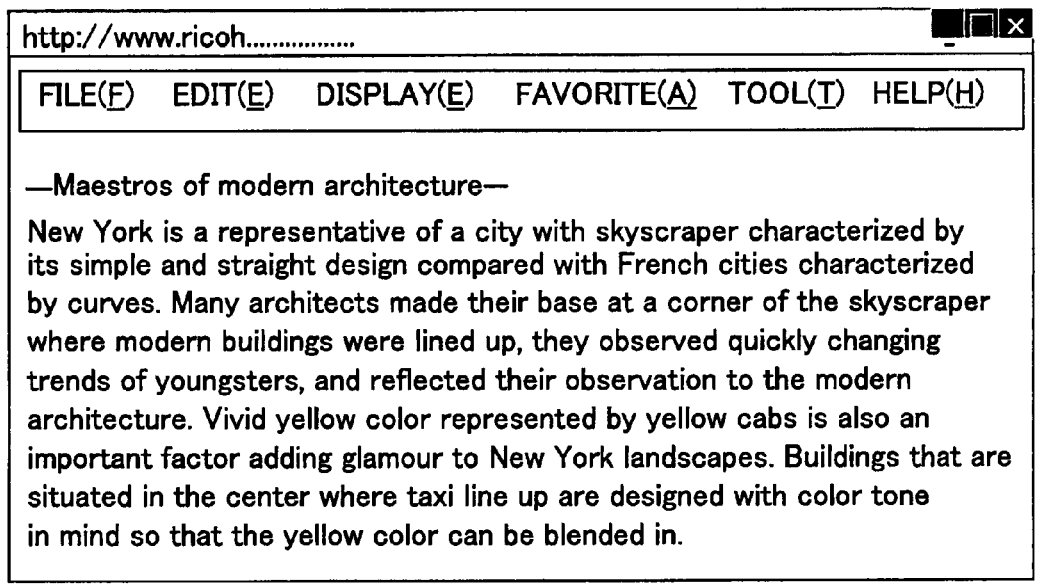
FIG. 15A diagrammatically shows an example of a URL destination document.
Figure 15B:
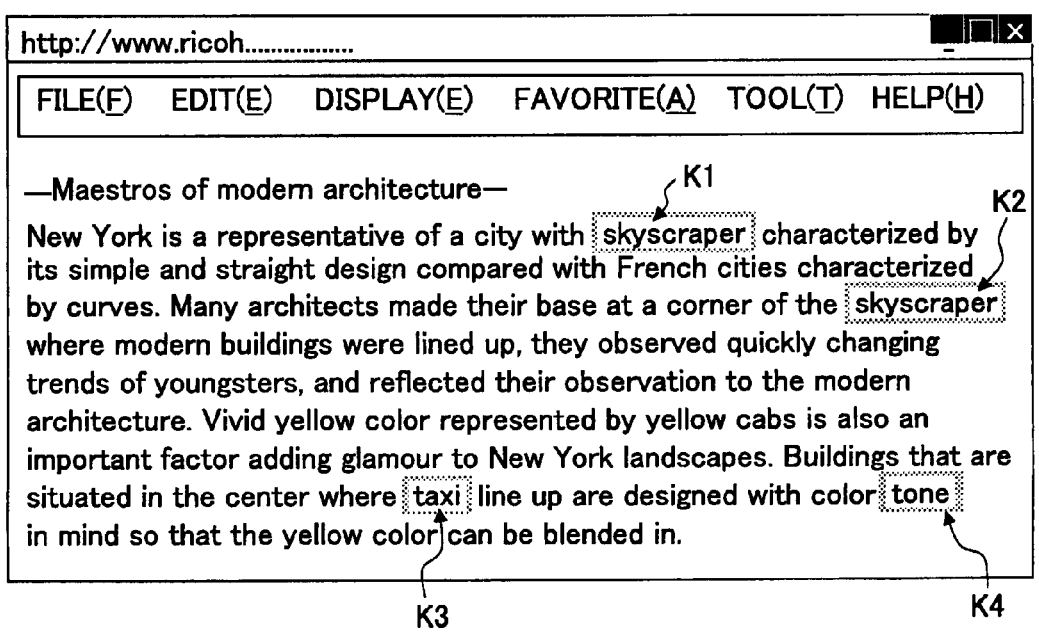
FIG. 15B shows a state in which keywords are selected from the document shown in FIG. 15A.

In contrast thereto, according to the embodiment of the present invention, as shown in FIG. 14C, a third person scans the above-mentioned document B (corresponding to a paper document) (Step S6), and creates a document B' (Step S7).

In this case, the third person creates a new QR code encoding, not only the URL of the document A which is obtained from decoding the original QR code attached to the document B, but also keywords, which are obtained from the words included in the document A.

For example, the keywords include the above-mentioned word "skyscraper" included in the document A as mentioned above.

Then, the third person uploads the document B' to the Internet (Step S8).

In this case, when the above-mentioned second person carries out full-text search, which includes a function to decode a QR code included in a document to search, to even obtain characters decoded from the QR code as a target for the search, with the word "skyscraper" as a keyword, not only the document A but also the document B' are hit, since the new QR code attached to the document B' directly includes the "skyscraper" as mentioned above.

In this case, according to the present embodiment, the URL and the keywords are encoded into the new QR code which is then attached to the document B' in Step S7 of FIG. 14C. As mentioned above, the QR code has an improved reliability allowing to positively obtain the original data encoded therein. Accordingly, in comparison to a case where the URL and the keywords were directly written in the document B', it is possible to positively avoid a situation that the URL and/or the keywords could not be properly read by some cause that image data thereof had been degraded through some image processing such as compressing or such. When the QR code is used, even when the image data thereof is thus degraded in the same way, it is possible in a higher possibility to positively obtain the original information encoded therein.

However, an embodiment of the present invention may alternatively be configured that, in the document B', the URL of the document A (related information) and the keywords, extracted from the words included in the document A, are directly written, instead of being encoded in the QR code. Also in this case, the basic advantage of the present invention, that is, the document B' can also be hit as mentioned above in full-text search, is available in the same way.

The present invention is not limited to the above-described embodiments, and variations and modifications may be made without departing from the basic concept of the present invention claimed below.

The present application is based on Japanese Priority Application No. 2006-008495, filed on Jan. 17, 2006, the entire contents of which are hereby incorporated herein by reference.

What is claimed is:

1. An image processing apparatus for creating an electronic file from a paper document with the use of an optical reading device, comprising:
   a detecting part detecting a code included in image data read by means of the optical reading device;
   a data creating part decoding said code to obtain identification information, obtaining related information identified by said identification information, and obtaining character information from said related information, and creating character data from said character information; and
   a file creating part creating a document file storing said character data, wherein said character data is stored in a text layer when said document file comprises the text layer and an image layer.

2. The image processing apparatus as claimed in claim 1, wherein:
   said character data comprises a keyword selected from the character information of the related information.

3. The image processing apparatus as claimed in claim 1, wherein:
   when the related information obtained from the code comprises image information, said data creating part once obtains character information by means of carrying out optical character recognition processing on said image data, and selects a keyword from said character information.

4. The image processing apparatus as claimed in claim 1, wherein:
   when the related information obtained from the code comprises multimedia information, said data creating part once obtains the character information by means of reproducing said multimedia information to recognize character information therefrom, and selects a keyword from said character information.

5. The image processing apparatus as claimed in claim 4, wherein said multimedia information comprises stream data.

6. An image processing apparatus for creating an electronic file from a paper document with the use of an optical reading device, comprising:
   a detecting part detecting a code included in image data read by means of the optical reading device;
   a data creating part decoding said code to obtain identification information, obtaining related information identified by said identification information, and obtaining character information from said related information, and creating character data from said character information; and a file creating part creating a document file storing said character data, wherein said character data is stored in at least one of a plurality of layers, when said document file comprises the plurality of layers and said character data is stored in said document file at a position on or the proximity of the position of said code in said image data.

7. An image processing apparatus for creating an electronic file from a paper document with the use of an optical reading device, comprising:

a detecting part detecting a code included in image data read by means of the optical reading device;

a data creating part decoding said code to obtain identification information, obtaining related information identified by said identification information, and obtaining character information from said related information, and creating character data from said character information; and a file creating part creating a document file storing said character data, wherein said detecting part once extracts a rectangle of the code from the read image data, and selects an area of the code therefrom to decode.

8. An image processing apparatus for creating an electronic file from a paper document with the use of an optical reading device, comprising:

a detecting part detecting a code included in image data read by means of the optical reading device;

a data creating part decoding said code to obtain identification information, obtaining related information identified by said identification information, and obtaining character information from said related information, and creating character data from said character information; and a file creating part creating a document file storing said character data, wherein said identification information comprises a URL of the Internet and said related information comprises a document located at said URL.

9. An image processing apparatus for creating an electronic file from a paper document with the use of an optical reading device, comprising:

a detecting part detecting a code included in image data read by means of the optical reading device;

a data creating part decoding said code to obtain identification information, obtaining related information identified by said identification information, and obtaining character information from said related information, and creating character data from said character information; and a file creating part creating a document file storing said character data, wherein when the related information obtained from the code comprises multimedia information, said data creating part once obtains the character information by means of reproducing said multimedia information to recognize character information therefrom, and selects a keyword from said character information and said multimedia information comprises at least one of a voice and a moving picture which comprises a telop as the character information.

10. An image processing apparatus for creating an electronic file from a paper document with the use of an optical reading device, comprising:

a detecting part detecting a code included in image data read by means of the optical reading device;

a data creating part decoding said code to obtain identification information, obtaining related information identified by said identification information, and obtaining character information from said related information, and creating character data from said character information; and a file creating part creating a document file storing said character data, wherein said character data is stored in an invisible layer when said document file comprises the invisible layer and a visible layer.

11. An image processing method for creating an electronic file from a paper document with the use of an optical reading device, comprising the steps of:

detecting a code included in image data read by means of the optical reading device;

decoding said code to obtain identification information, obtaining related information identified by said identification information, and obtaining character information from said related information, and creating character data from said character information; and creating a document file storing said character data, wherein said character data is stored in a text layer when said document file comprises the text layer and an image layer.

12. The image processing method as claimed in claim 11, wherein:

said character data comprises a keyword selected from the character information of the related information.

13. The image processing method as claimed in claim 11, wherein:

when the related information obtained from the code comprises image information, said step of creating the document file once obtains character information by means of carrying out optical character recognition processing on said image data, and selects a keyword from said character information.

14. The image processing method as claimed in claim 11, wherein:

when the related information obtained from the code comprises multimedia information, said step of creating the document file once obtains the character information by means of reproducing said multimedia information to recognize character information therefrom, and selects a keyword from said character information.

15. The image processing method as claimed in claim 13, wherein said multimedia information comprises stream data.

16. An image processing method for creating an electronic file from a paper document with the use of an optical reading device, comprising the steps of:

detecting a code included in image data read by means of the optical reading device;

decoding said code to obtain identification information, obtaining related information identified by said identification information, and obtaining character information from said related information, and creating character data from said character information; and creating a document file storing said character data, wherein said character data is stored in at least one of a plurality of layers, when said document file comprises the plurality of layers and said character data is stored in said document file at a position on or the proximity of the position of said code in said image data.

* * * * *